United States Patent [19]

Takamori

[11] Patent Number: 5,287,186
[45] Date of Patent: Feb. 15, 1994

[54] VIDEO SWITCHER APPARATUS WITH BACK-UP SYSTEM

[75] Inventor: Tsutomu Takamori, Kanagawa, Japan

[73] Assignee: Sony Corporation, Tokyo, Japan

[21] Appl. No.: 933,809

[22] Filed: Aug. 24, 1992

[30] Foreign Application Priority Data

Aug. 30, 1991 [JP] Japan .................... 3-220409

[51] Int. Cl.⁵ .......................... H04N 5/268
[52] U.S. Cl. .................... 348/705; 348/722
[58] Field of Search ........... 358/181, 185, 190, 139; 340/825.16; 375/3.1, 3, 4, 38, 40, 102; 371/8.1, 8.2, 66, 9.1; H04N 5/268, 7/15, 7/167

[56] References Cited

U.S. PATENT DOCUMENTS

| | | | |
|---|---|---|---|
| 4,700,230 | 10/1987 | Pshtissky et al. | 358/181 |
| 4,775,976 | 10/1988 | Yokoyama | 371/9 |
| 5,036,455 | 7/1991 | Atwood | 364/200 |
| 5,081,619 | 1/1992 | Nagata | 370/13 |

OTHER PUBLICATIONS

JP 030270585 (Sony) Abstract.

*Primary Examiner*—Victor R. Kostak
*Assistant Examiner*—Nathan J. Flynn
*Attorney, Agent, or Firm*—William S. Frommer; Alvin Sinderbrand

[57] ABSTRACT

A switcher apparatus for selectively supplying video signals comprising a main switching unit, a back-up switching unit, a switching device and a housing. The main and back-up switching units receive a plurality of input video signals, from which desired video signals are selected and supplied therefrom. The switching device receives the selected video signals from the main and back-up switching units and outputs one of the two received signals. The housing secures the main and back-up switching units and enables removal therefrom and installation therein of one of the main and back-up switching units while the other switching unit operates so as to provide continuous selecting of desired video signals and supplying of the same by at least one of the main and back-up switching units to the switching device.

5 Claims, 5 Drawing Sheets

F I G. 4A
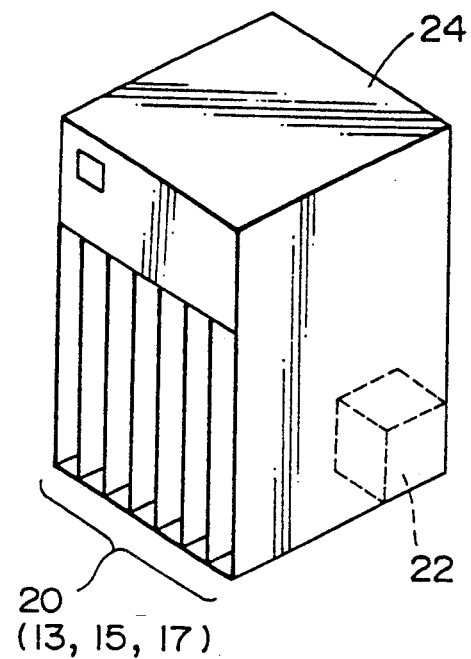
F I G. 4B
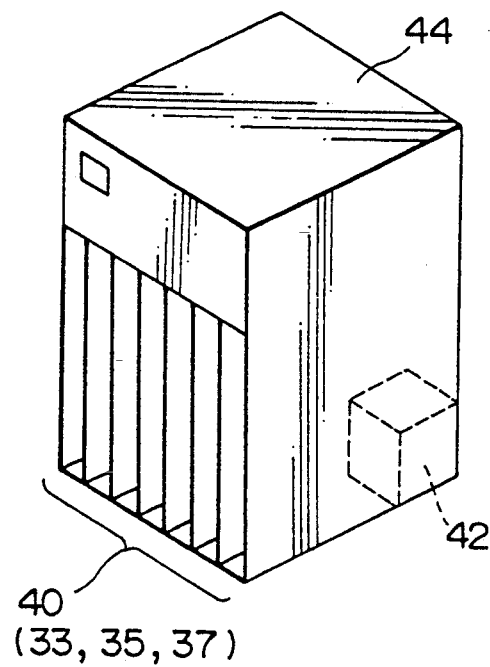

VIDEO SWITCHER APPARATUS WITH BACK-UP SYSTEM

BACKGROUND OF THE INVENTION

1. Field of the Invention

The present invention relates to a switcher apparatus that outputs video signals selectively.

2. Description of the Prior Art

Some electronic equipment is known to operate on the so-called dual operation method that involves furnishing two units of the same component for backup purposes. For example, a main power unit and sub power unit are provided, the sub power unit taking over the main power unit in case the latter fails.

One disadvantage of this prior art method is that once the backup unit takes over, there is no other unit that can take over the sole currently operating unit if the latter should fail. Additional measures to counter such contingencies have been insufficient so far.

SUMMARY OF THE INVENTION

It is therefore an object of the present invention to provide a switcher apparatus that allows the failed main unit to be replaced while the backup unit is operating.

In carrying out the invention and according to one aspect thereof, there is provided a switcher apparatus for selectively outputting input video signals, the switcher apparatus comprising: a main switching unit supplied with a plurality of input video signals so as to output a desired video signal selected from among the plurality of input video signals; a sub switching unit supplied with the plurality of input video signals so as to output a desired video signal selected from among the plurality of input video signals; switching means supplied with the output signal from the main switching unit and the output signal from the sub switching unit so as to output one of the two signals supplied; and a housing for removably securing the main switching unit and the sub switching unit so that one of the main switching unit and the sub switching unit is removed from the housing while the output signal from the other unit is being output to the switching means, the removal of one of the two units being performed without adversely affecting the operation of the other unit.

The invention allows either the main unit or the sub unit to be attached and detached to and from the housing while the other unit is still operating. For example, if the main unit fails, the backup unit is started and kept operative while the failed unit is being replaced with ease.

These and other objects, features and advantages of the invention will become more apparent upon a reading of the following description and appended drawings.

BRIEF DESCRIPTION OF THE DRAWINGS

FIGS. 4A and 4B are perspective views of processor units in the embodiment of FIG. 1.

DETAILED DESCRIPTION OF THE PREFERRED EMBODIMENTS

Figure 1:
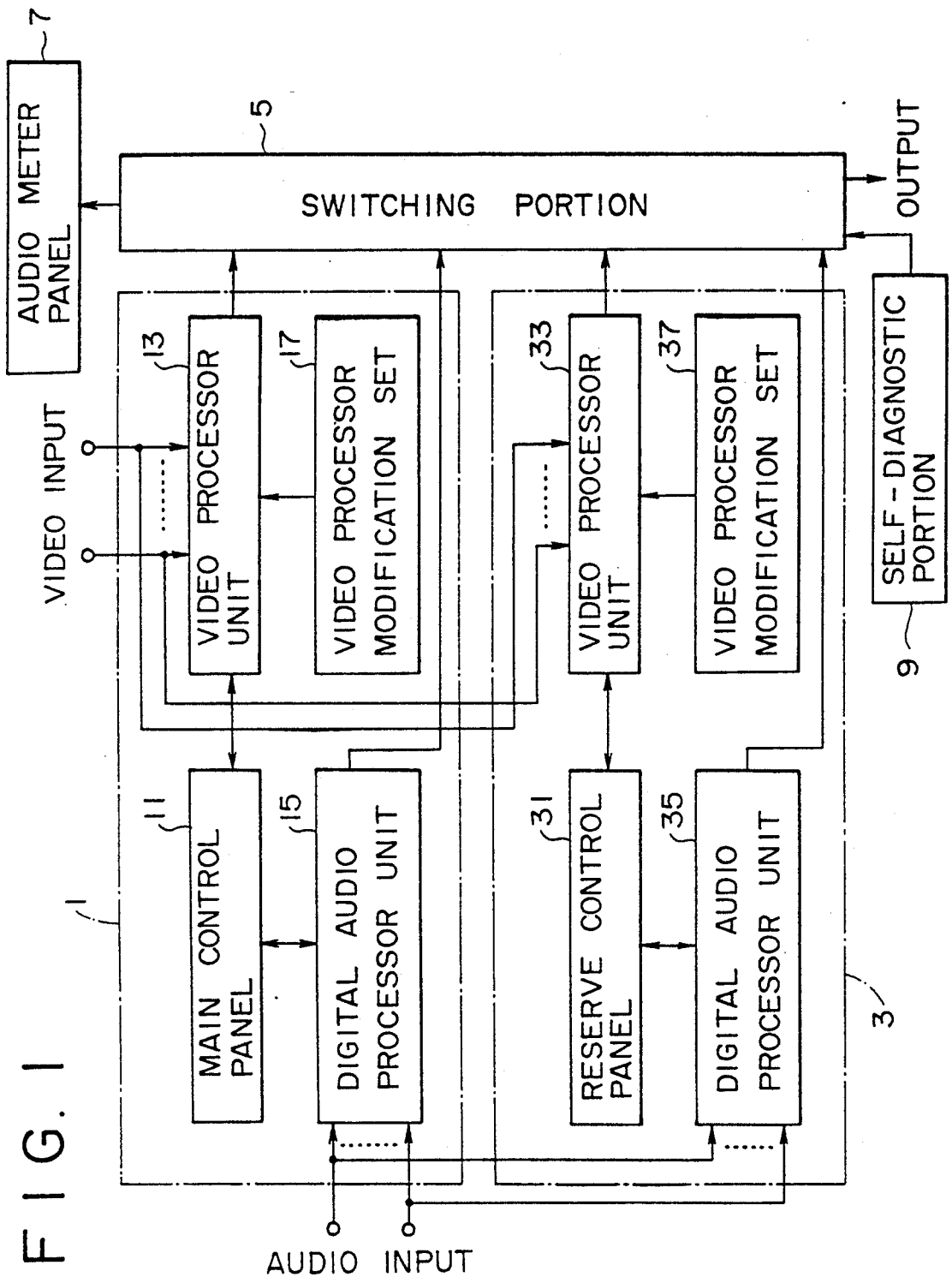
FIG. 1 is a block diagram of a switcher apparatus embodying the present invention.

One preferred embodiment of the present invention will now be described with reference to the accompanying drawings. FIG. 1 is a block diagram of the embodiment. In FIG. 1, a main block 1 comprises a main control panel 11, a video processor unit 13, a digital audio processor unit 15 and a video processor modification set (video processor unit) 17. The video processor unit 13 is fed with input video signals over a plurality of channels and selects one of the input video signals. The digital audio processor unit 15 is supplied with input audio signals over a plurality of channels and selects one of the input audio signals.

A reserve block 3 includes a reserve control panel 31, a video processor unit 33, a digital audio processor unit 35 and a video processor modification set (video processor unit) 37. The units 33, 35 and 37 are identical to their counterparts in the main block 1. The video processor unit 33 is fed with input video signals over a plurality of channels and selects one of the input video signals. The digital audio processor unit 35 is supplied with input audio signals over a plurality of channels and selects one of the input audio signals.

A switching portion 5 illustratively contains mechanical relays. The switching portion 5, supplied with the output video and audio signals from the units 13 and 15 in the main block 1 and with the output video and audio signals from the units 33 and 35 in the reserve block 3, selects one of the two blocks to admit the signals therefrom. An audio meter panel 7 is connected to the switching portion 5.

Self-diagnostic portions 9 supervise the operating status of the main and reserve blocks 1 and 3. In the main block 1, one self-diagnostic portion supervises the main control panel 11 and another the processor units 13, 15 and 17 for their operating status. In the reserve block 3, one self-diagnostic portion supervises the reserve control panel 31 and another the processor units 33, 35 and 27 for their operating status. If any of the self-diagnostic portions 9 detects a failure, the output of the applicable self-diagnostic portion 9 causes the switching portion 5 to switch from the failed block to the other block. For example, if the main block 1 develops a failure, the switching portion 5 disconnects the main block 1 and allows the reserve block 3 to take over.

Figure 2:
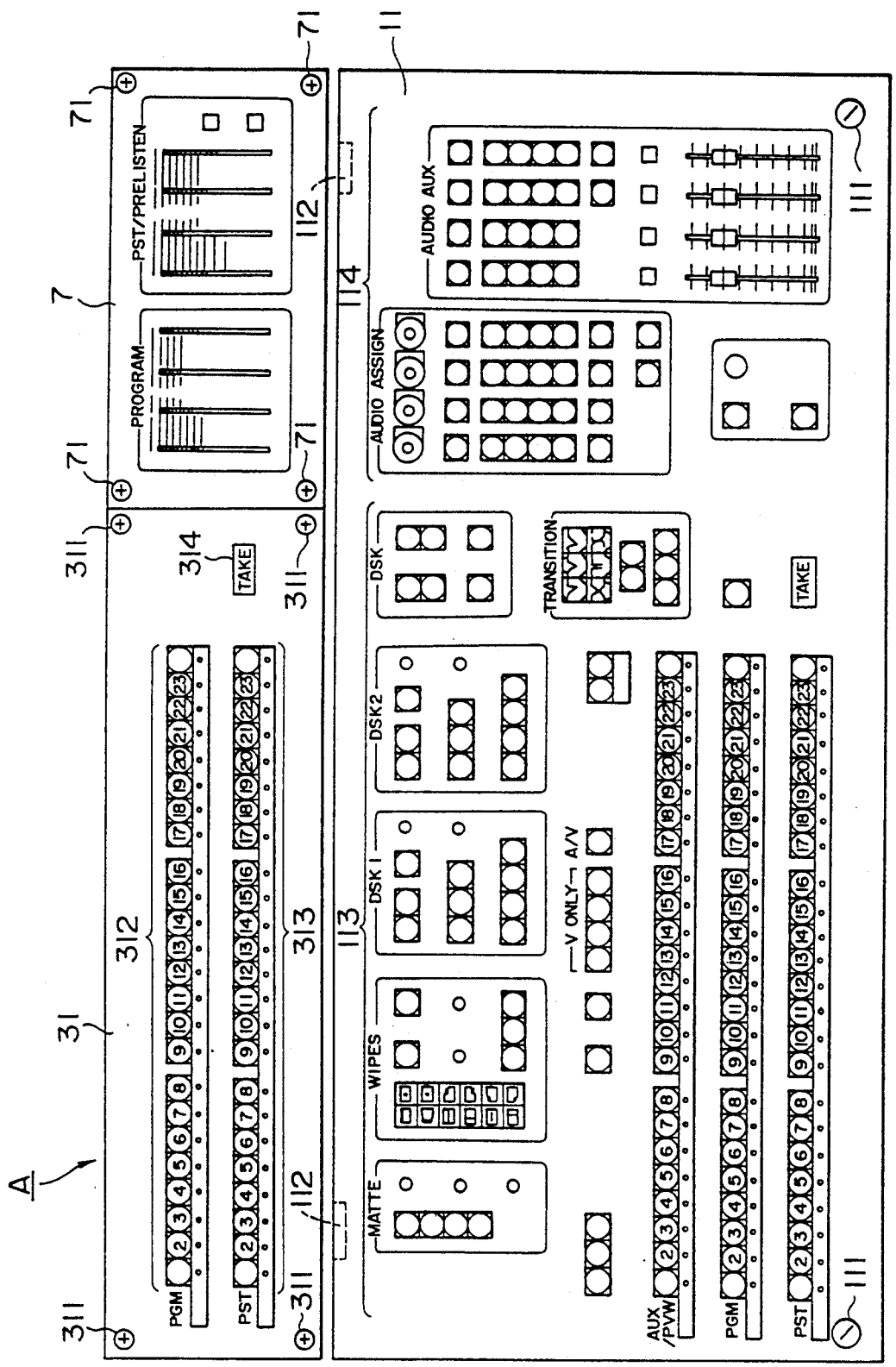
FIG. 2 is a schematic view illustrating a control panel arrangement of the embodiment of FIG. 1.

FIG. 2 schematically shows a control panel arrangement of the embodiment including the control panel 11 of the main block 1, the control panel 31 of the reserve block 3, and the audio meter panel 7, all the panels being contained in a console A.

The panels 31 and 7 are fixedly attached to the console A with screws 311 and 71 at four corners respectively. Loosening the screws 311 or 71 allows the panel 31 or 7 to be detached from the console A.

The panel 11 is fixedly attached to the console A with screws 111 at two bottom corners while being hitched onto the console A at two top corners using known detachable hinges 112. Loosening the screws 111 allows the panel 11 to be raised upward around the hinges 112. The raised panel may be hitched onto a stopper, not shown, so that the panel interior may be inspected in that state. The detachable structure of the hinges 112 allows the panel 11 to be detached from the console A when the panel 11 is moved crosswise as raised.

On the panel 11 are video system operation switches 113 and audio system operation switches 113. These are the switches that are required by a section playing the role of a master switcher. The structures and functions of the switch groups 113 and 114 are of known types and the description thereof will be omitted hereunder.

On the panel 31 are switches that are basic to the master switcher function. These basic switches are identical in function and layout to some of the switches 113 and 114 on the panel 11; the basic switches on the panel 31 constitute such switch groups as PGM 312, PST 313 and TAKE 314. The switch group PGM 312 is made of switches for selecting a background image in effect before execution of transition. The switch group PST 313 contains switches for selecting a background image that appears in the next transition. The switch group TAKE 314 is constituted by switches for executing transition.

Users have two options in terms of overall switch layout and assignment. One option involves determining which of the switches on the panel 11 are to be duplicated functionally on the panel 31. The other option involves deciding whether or not to furnish the panel 41 with additional switches whose functions are not provided by any of the switches on the panel 11.

Figure 3A:
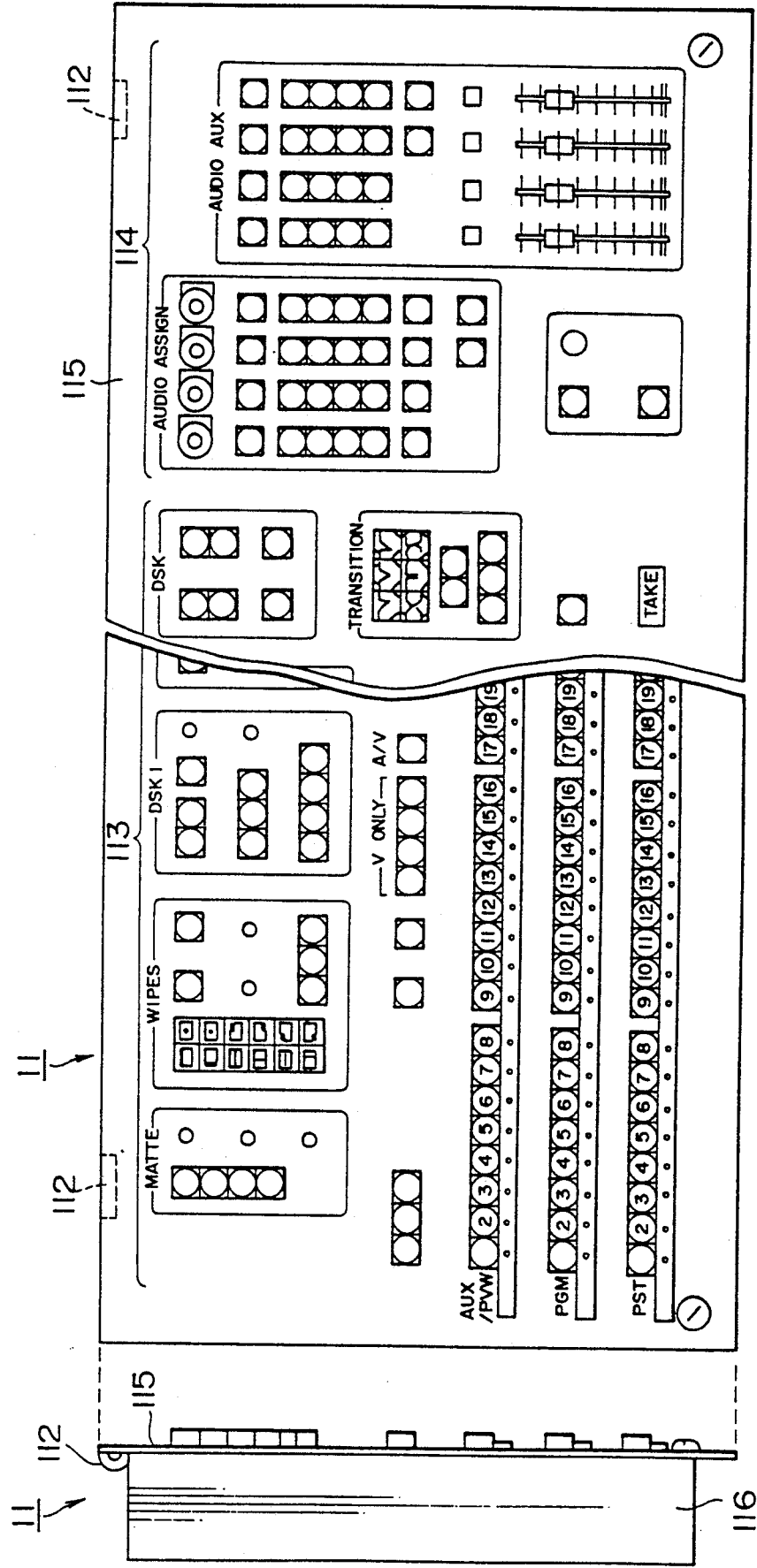
FIGS. 3A through 3C are schematic views depicting various panels of the embodiment of FIG. 1.
Figure 3B:
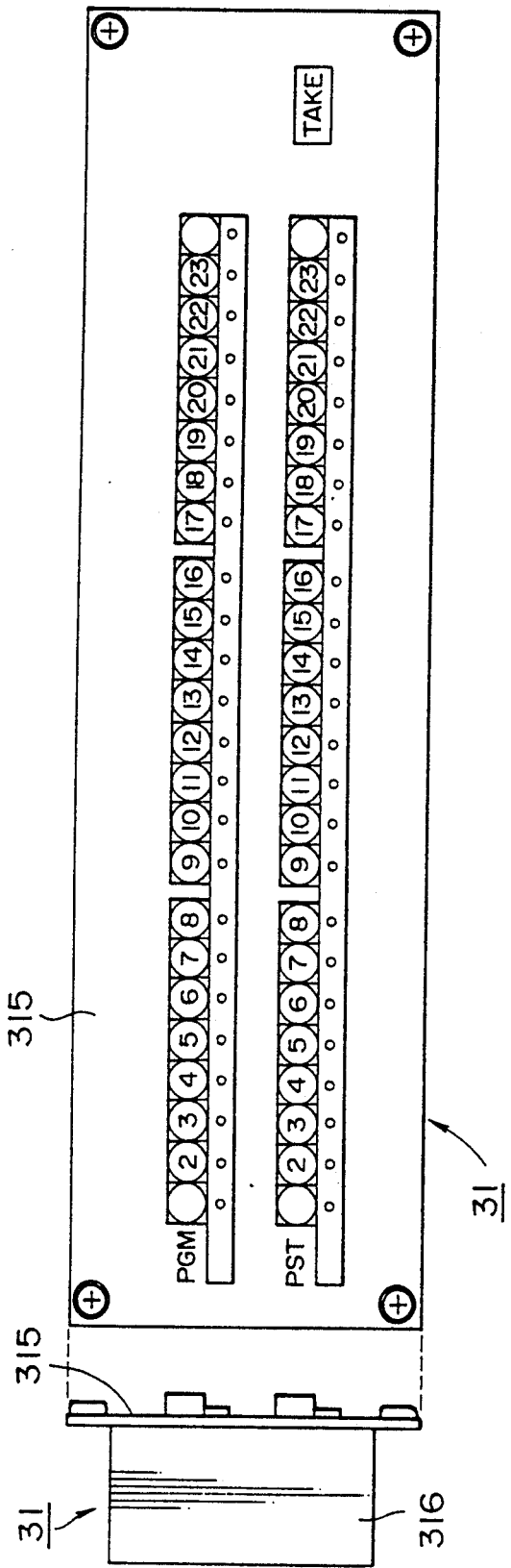
Figure 3C:
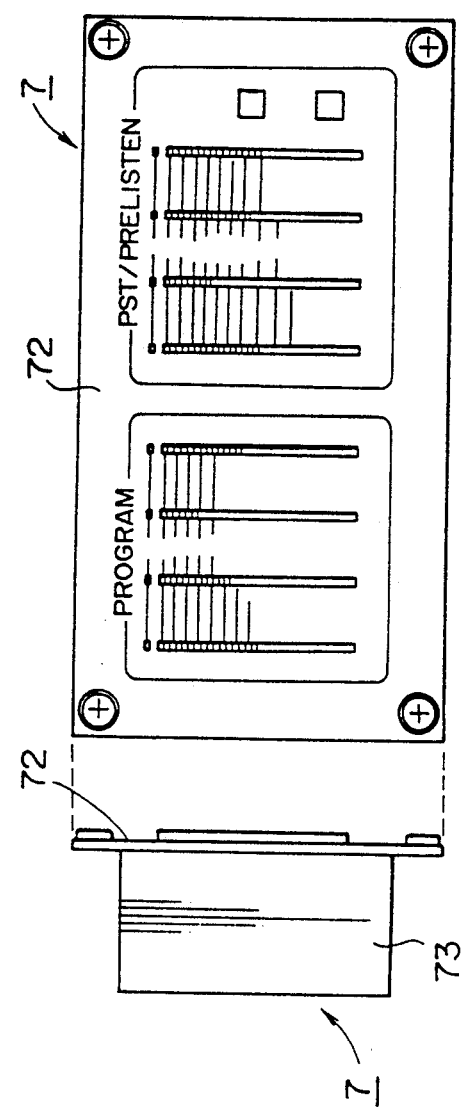

FIGS. 3A through 3C are plan and side views showing the appearance of the panels 11, 31 and 7. The panels 11, 31 and 7 are enclosed in a separate housing each and are composed respectively of control panels proper 115, 315 and 27 and of printed circuit board enclosures 116, 316 and 73 screwed to the panel housings.

The printed circuit board enclosures accommodate printed circuit boards, not shown, which control the operation of the respective panels while exchanging command signals with each of the processor units.

FIG. 4A shows how the processor units 13, 15 and 17 are configured in the main block 1. The units 13, 15 and 17, contained in an enclosure 24, are each made of a plurality of card type printed circuit boards 20. The printed circuit boards 20 thus installed are interconnected by the known method of inserting into connectors of the enclosure 24 the connector plugs formed on the boards 20. A power supply unit 22 is dedicated to supplying power to the printed circuit boards 20, the main control panel 11 and other components of the main block 1.

FIG. 4B illustrates how the processor units 33, 35 and 37 are configured in the reverse block 3. As with the main block 1, each of the units 33, 35 and 37 is composed of a plurality of card type printed circuit boards 40. The enclosure 44 of the reverse block 3 contains a power supply unit 42 dedicated to supplying power to the printed circuit boards 40, the reserve control panel 31 and other components of the reserve block 3.

The enclosures 24 and 44 are removably attached with screws or the like to the interior of the console. The enclosures are positioned illustratively under the main control panel 11, as shown in FIG. 2, for easy removal and attachment.

As described, when the self-diagnostic portion 9 of the embodiment detects a failure in the main block 1 or in the reserve block 3, the switching portion 5 switches from the failed block to the normal block. Thus if the main block 1 fails, the reserve block 3 takes over and continues the operation. This makes it possible to circumvent serious troubles in sensitive applications. For example, in a broadcasting application, severe troubles such as the stoppage of broadcast signal transmission are avoided through changeover from the failed block to the normal block.

The control panel 11 and the processor units 13, 15 and 17 in the main block 1, as well as the control panel 31 and the processor units 33, 35 and 37 in the reserve block 3 are each attached to and removed from their enclosures independently. This construction allows any of these components to be replaced easily in case of failure.

As described, the embodiment includes four self-diagnostic portions 9: one for the control panel 11; another for the processor units 13, 15 and 17; another for the control panel 31; and another for the processor units 33, 35 and 37. Alternatively, the embodiment may additionally contain a memory device for storing diagnosed results and a display portion for display thereof. These added attachments facilitate localization of the failed panel or unit and thereby enhance readiness to deal with the failure.

In the above embodiment, a failure in the main block 1 or in the reserve block 3 causes the applicable self-diagnostic portion 9 to output a signal that automatically operates the switching portion 5 for block changeover. Alternatively, the switching portion 5 may be operated manually. In that case, the panels 11 and 31 may be conveniently equipped with indicators for indicating the type of the current failure and the status of the change-over being executed.

Another modification of the embodiment may be to furnish a main control unit IBO independently of the switcher apparatus so that the main block 1 and the reserve block 3 are kept in the same switcher mode under remote control via a data bus stemming from the unit IBO. This arrangement prevents abrupt changes in the output contents upon activation of the switching portion 5.

Alternatively, there may be provided between the main block 1 and the reserve block 3 an emulator device which one of the blocks or the main block 1 uses to place the other block in the same switcher mode. The emulator device prevents abrupt changes in the output contents upon activation of the switching portion 5 when the control panel 11 or 13 is operated manually.

The switching portion 5 may be constituted by electromagnetic relays having mechanical contacts. This arrangement allows the switching portion 5 to be composed of a known system. The result is the implementation of an inexpensive, simply structured switching mechanism suitable for use in an application wherein the mechanism is required to operate rarely but unfailingly.

The processor units 13, 15 and 17 in the main block 1 (in enclosure 24 of FIG. 4A) may be manufactured in a manner identical to and interchangeability with the processor units 33, 35 and 37 in the reserve block 3 (in enclosure 44 of FIG. 4B). The interchangeability of these units ensures easy design and production phases. The need for fewer spare parts to be provided for the switcher apparatus affords major benefits in terms of reduced costs and enhanced serviceability of the apparatus.

As described and according to the invention, any one of the main unit and the reserve unit may be attached and detached to and from its housing while the other unit is still operating. For example, if the main unit fails, the reserve unit is started and kept operative while the failed unit is being replaced with ease.

It is to be understood that while the invention has been described in conjunction with a specific embodiment, it is evident that many alternatives, modifications and variations will become apparent to those skilled in the art in light of the foregoing description. Accordingly, it is intended that the present invention embrace all such alternatives, modifications and variations as fall within the spirit and scope of the appended claims.

What is claimed is:

1. A switcher apparatus for selectively supplying video signals, said switcher apparatus comprising:

a main switching unit operative for receiving a plurality of input video signals and for selecting a desired video signal therefrom;

a back-up switching unit operative for receiving said plurality of input video signals and for selecting a desired video signal therefrom;

switching means receiving the selected desired video signals from said main switching unit and said back-up switching unit for supplying one of the received selected video signals therefrom; and a housing for securing said main switching unit and said back-up switching unit and for enabling removal therefrom and installation therein of one of said main switching unit and said back-up switching unit while the other of said main switching unit and said back-up switching unit operates so as to provide continuous selecting of a desired video signal and supplying of the same by at least one of said main switching unit and said back-up switching unit to said switching means.

2. A switcher apparatus according to claim 1, further comprising self-diagnostic means for detecting a failure of said main switching unit and said back-up switching unit and, upon such detection, for supplying a failed signal to said switching means which, in response thereto, supplies therefrom the respective received selected video signal from the one of said main switching unit and said back-up switching unit which has not failed.

3. A switcher apparatus according to claim 1, further comprising two power supply units for respectively supplying power to said main switching unit and said back-up switching unit.

4. A switcher apparatus according to claim 1, wherein each of said main and back-up switching units include a control panel and at least one circuit board.

5. A switcher apparatus according to claim 4, wherein each said control panel is removably attached to said housing with screws.

* * * * *